United States Patent
Oya et al.

(10) Patent No.: US 7,763,228 B2
(45) Date of Patent: Jul. 27, 2010

(54) METHOD OF PRODUCING CARBON NANOMATERIALS AND CENTRIFUGAL MELT SPINNING APPARATUS

(75) Inventors: Asao Oya, Kiryu (JP); Terukazu Sando, Kiryu (JP)

(73) Assignee: National University Corporation Gunma University, Gunma (JP)

( * ) Notice: Subject to any disclaimer, the term of this patent is extended or adjusted under 35 U.S.C. 154(b) by 492 days.

(21) Appl. No.: 11/573,391

(22) PCT Filed: Aug. 11, 2005

(86) PCT No.: PCT/JP2005/014724

§ 371 (c)(1), (2), (4) Date: Feb. 7, 2007

(87) PCT Pub. No.: WO2006/016641

PCT Pub. Date: Feb. 16, 2006

(65) Prior Publication Data

US 2008/0050304 A1 Feb. 28, 2008

(30) Foreign Application Priority Data

Aug. 11, 2004 (JP) ............................. 2004-234406

(51) Int. Cl.
*D01F 9/12* (2006.01)
(52) U.S. Cl. .................. 423/447.1; 423/447.6; 977/842
(58) Field of Classification Search ............. 423/447.1, 423/447.6; 264/29.2; 977/842
See application file for complete search history.

(56) References Cited

U.S. PATENT DOCUMENTS 3,776,669 A * 12/1973 Ito et al. .................... 425/8
4,762,652 A * 8/1988 Miyamori et al. ............ 264/6

FOREIGN PATENT DOCUMENTS

| EP | 0 220 727 A2 | 5/1987 |
|----|---|---|
| JP | 58-203105 | 11/1983 |
| JP | 62-132181 | 8/1987 |
| JP | 2003-146634 | 5/2003 |
| WO | WO 03/000589 A1 | 1/2003 |

OTHER PUBLICATIONS

Terukazu Sandou et al., "Preparation of carbon nanotubes by centrifugal spinning of coreshell polymer particles", Carbon, 43 pp. 2013-2017, 2005.
Terekazu Sandou at al., "A new centrifugal spinning apparatus", Tanso, 2006, No. 225, pp. 344-346.

* cited by examiner

*Primary Examiner*—Stuart Hendrickson
*Assistant Examiner*—Michelle Hou
(74) *Attorney, Agent, or Firm*—Hogan Lovells US LLP

(57) ABSTRACT

A carbon nanomaterial produced by: performing centrifugal melt spinning of core-shell particles that are prepared by using fine particles containing a carbon precursor polymer and a thermally decomposable polymer that disappears as a result of heat treatment, wherein the core-shell particles are heated up to a temperature at which phase separation thereof is not caused, and pressed against a plate-like heater 12 having a large number of pores 12A that penetrate therethrough in a thickness direction of the plate-like heater using centrifugal force; making the fiber obtained by the centrifugal melt spinning infusible; and performing carbonization thereof. According to this method, a carbon nanomaterial such as a carbon nanotube or a carbon nanofiber can be produced with high efficiency.

8 Claims, 3 Drawing Sheets

METHOD OF PRODUCING CARBON NANOMATERIALS AND CENTRIFUGAL MELT SPINNING APPARATUS

TECHNICAL FIELD

The invention relates to a method of producing a carbon nanomaterial and to a centrifugal melt spinning apparatus, and more specifically, relates to a method of producing a carbon nanomaterial that is suitable for production of carbon nanomaterials such as carbon nanotubes and carbon nanofibers, and a centrifugal melt spinning apparatus that is directly used in the carbon nanomaterial production method.

BACKGROUND ART

Conventionally, as a method of producing carbon nanotubes, a polymer blend spinning technique is known (for example, see Patent Document 1 below). Specifically, in this method, a thermally decomposable polymer that disappears as a result of heat treatment and a carbon precursor polymer that leaves carbon after heat treatment are used as starting materials to prepare a polymer blend, and the polymer blend is stretched by melt-spinning, then the carbon precursor polymer is made infusible, and thereafter carbonized to produce carbon nanotubes. This method, by which high purity carbon nanotubes can be obtained, is far superior as a mass-production technique to currently used gas phase methods.

In the process of spinning the polymer blend according to this method a continuous melt spinning technique is generally applied in which spinning is performed by heating a spinning machine that houses a polymer blend to about 300° C. in an electric furnace, supplying argon gas or nitrogen gas to the spinning machine and discharging the molten polymer blend from the spinning machine through a nozzle of the spinning machine, and winding the fiber discharged through the nozzle around a bobbin rotated by a motor.

In the continuous melt spinning technique, however, there is a problem that phase separation of the polymer blend in the spinning machine kept at a high temperature is caused due to melting, which is attributed to the long time period of spinning, and thus the desired carbon nanotubes cannot be efficiently obtained. The above-mentioned Patent Document suggests that a spinning method in which fibers are extracted using centrifugal force may be applied, but no specific centrifugal melt spinning method is disclosed therein.

Patent Document 1: Japanese Patent Application Laid-Open (JP-A) No. 2003-146634

DISCLOSURE OF THE INVENTION

Problem to be Solved by the Invention

The invention has been made to solve the above problems, and an object of the invention is to provide a method of producing a carbon nanomaterial that can efficiently produce a carbon nanomaterial, and more specifically to provide a method of producing a carbon nanomaterial that can efficiently produce a carbon nanomaterial such as carbon nanotubes and carbon nanofibers by performing centrifugal melt spinning under a temperature condition at which phase separation of core-shell particles, that are formed in a polymer blend containing a carbon precursor polymer as a starting material for a carbon nanomaterial, is not caused. It is a further object of the invention to provide a centrifugal melt spinning apparatus that is suitable for direct use in the method of producing a carbon nanomaterial with high efficiency.

Means for Solving the Problems

To achieve the above objects, the method of producing a carbon nanomaterial according to the invention includes performing centrifugal melt spinning by pressing core-shell particles against a plate-like heater using centrifugal force to obtain a fiber, making the obtained fiber infusible and carbonizing the fiber, wherein the core-shell particles are fine particles of a thermally decomposable polymer that disappears as a result of heat treatment that are coated with a carbon precursor polymer, and wherein the plate-like heater has a number of perforating pores that pass through in a thickness direction of the heater and is heated to a temperature at which phase separation of the core-shell particles is not caused.

The core-shell particles that can be used in the invention can be exemplified by particles having a core-shell structure in which fine particles of a thermally decomposable polymer are coated with a carbon precursor polymer, however, this core-shell structure is not limited to such a two-layer core-shell structure as described above and, for example, the particles may have a three-layer structure in which fine particles of a thermally decomposable polymer are coated with a carbon precursor polymer, and the surface thereof is further coated with a thermally decomposable polymer. Further, as the polymer blend having the core-shell structure according to the invention, particles in which fine particles of a carbon precursor polymer are dispersed among a large number of fine particles of thermally decomposable polymer can be used.

According to the invention, centrifugal melt spinning is performed while a heater provided in a centrifugal melt spinning apparatus is heated to a temperature at which phase separation of core-shell particles is not caused. In this process, the temperature at which phase separation of the core-shell particles is not caused can be selected as appropriate according to the properties of the polymers to be used, but is preferably 100° C. or more and less than 270° C., in general. This is because performing of centrifugal melt spinning may become difficult, if the temperature is less than 100° C.

A centrifugal melt spinning apparatus directly used in the method of producing a carbon nanomaterial according to the invention may include: a circular plate provided rotatably; a plate-like heater having a number of pores that penetrate through in a thickness direction of the heater and is placed in an upright manner on one side of the circular plate following the circumference of the circular plate; and a driving device that drives the circular plate to rotate.

A carbon nanomaterial may be prepared by feeding the core-shell particles into the centrifugal melt spinning apparatus, heating the heater to a temperature at which phase separation of the core-shell particles is not caused, driving the circular plate to rotate so that the core-shell particles are pressed against the heater by means of centrifugal force to perform centrifugal melt spinning, then making the obtained fiber infusible and carbonizing the fiber. In this process, a silicon carbide nanomaterial may also be produced in the same manner, by using a silicon carbide precursor polymer, that contains carbon and silicon, as the carbon precursor polymer Effects of the Invention As described above, the method of producing a carbon nanomaterial according to the invention achieves an advantage of producing a carbon nanomaterial with high efficiency, since the core-shell particles, in which fine particles that contain a carbon precursor polymer are coated with a thermally decomposable polymer that disappears as a result of heat treatment, undergo centrifugal melt spinning without causing phase separation, thus maintaining the core-shell structure thereof.

Additionally, the centrifugal melt spinning apparatus according to the invention achieves an advantage of producing a carbon nanomaterial with high efficiency while preventing phase separation of the core-shell particles, since the heater is heated to a temperature at which phase separation of the core-shell particles is not caused, and at the same time centrifugal melt spinning is performed in such a manner that the circular plate is driven to rotate to apply centrifugal force while melting the core-shell particles.

BEST MODE FOR CARRYING OUT THE INVENTION

Figure 1:
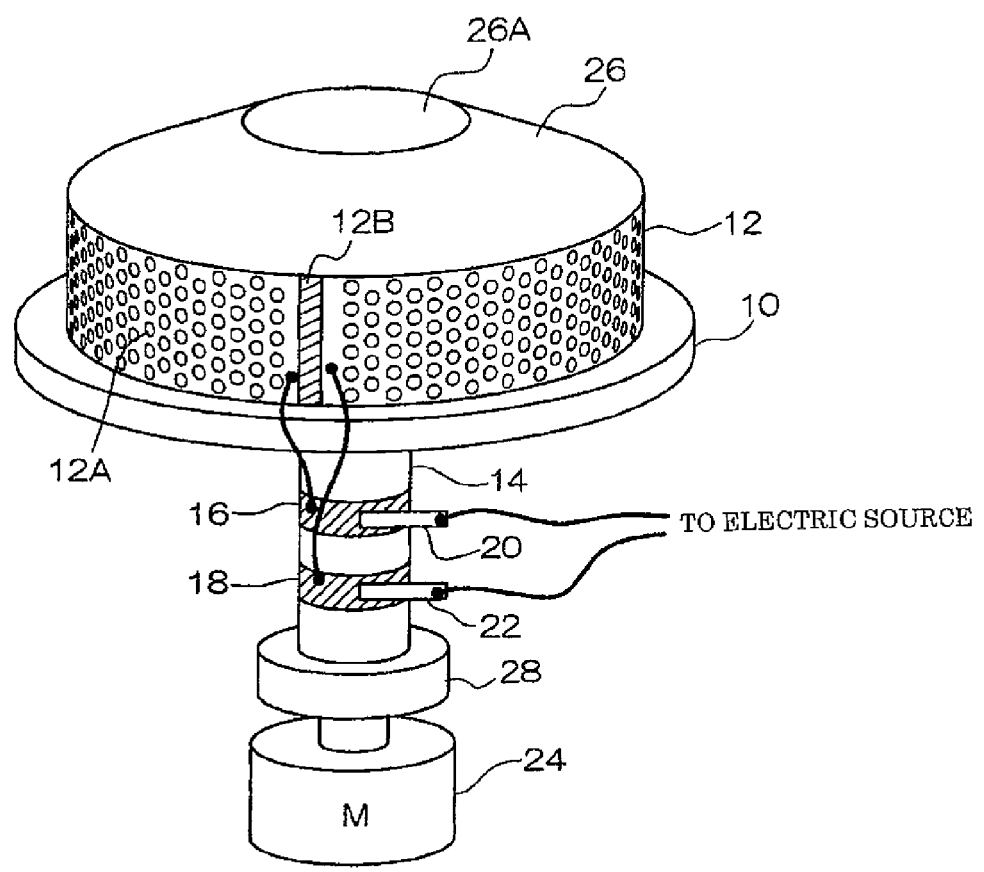
FIG. 1 is a schematic view of a centrifugal melt spinning apparatus of the invention.

Embodiments of the invention will now be described in detail with reference to the drawings. Referring to FIG. 1, a centrifugal melt spinning apparatus directly used in the carbon nanomaterial production method of the invention includes a circular plate 10 made of an insulator provided rotatably. On the upper side of the circular plate 10, an electric heater 12 that is formed by perforating a number of pores 12A in a nichrome plate having a specific width in a thickness direction of the plate, and is fixed along a circumferential direction of the circular plate 10 in such a manner that the side of the electric heater 12 stands vertically to the upper side of the circular plate 10. Both ends of the electric heater 12 are opposed to each other via a gap so as not to be in contact with each other, and an insulator is inserted into the gap. The diameter of the pores 12A may be, for example, 0.5 mm.

Thus, the electric heater 12 is formed in a cylindrical manner together with the insulator and fixed on the upper side of the circular plate 10 in such a manner that the central axis of the electric heater 12 coincides with the center of the circular plate 10. On the upper end of the electric heater 12 is fixed a substantially hollow and truncated-cone-shaped cover 26 having a material inlet 26A formed at the center thereof.

A rotary shaft 14 is fixed at the central part of the lower side of the circular plate 10, vertically to the lower side of the circular plate 10. On the side of the rotary shaft 14, a pair of ring-shaped electrodes 16 and 18 arranged in parallel are formed around the whole perimeter of the rotary shaft 14. The ring-shaped electrodes 16 and 18 are respectively connected to respective ends of the electric heater 12, via wirings. The ring-shaped electrodes 16 and 18 are respectively provided with respective brushes of a pair of brushes 20 and 22, that are connected to an electric source, so as to be in contact with the electrodes. The lower end of the rotary shaft 14 is connected to a driving shaft of a motor 24 via a connecting member 28, According to the centrifugal melt spinning apparatus, the starting material is fed into the inside of the electric heater 12, then the electric heater 12 is energized while rotated by the motor, and the starting material is melted by the electric heater 12. The molten starting material is discharged from the pores in the electric heater using centrifugal force and cooled with air, whereby the material can be stretched into the form of a fiber.

Methods for producing carbon nanotubes using the above centrifugal melt spinning apparatus will now be described.

First, fine particles comprising a thermally decomposable polymer (core particles) are coated with a carbon precursor polymer, then the surface thereof is further coated with a thermally decomposable polymer, and core-shell particles are formed.

The thermally decomposable polymer refers to a polymer that is decomposed and disappears under a heat treatment condition at which the carbon precursor polymer as described below is carbonized, i.e., a polymer that is decomposed and gasified by raising temperature. Any polymer may be selected and used as appropriate, as long as the polymer has a decomposition temperature that is lower than the heat treatment temperature at which the carbon precursor polymer used together is carbonized.

Examples of the thermally decomposable polymer that disappears as a result of heat treatment include polyolefin polymers such as polyethylene, polypropylene and polystyrene (PSt); polyester; diene polymers such as polybutadiene and polyisoprene; polyacrylates and polymers of acrylic acid derivatives, such as poly(methyl acrylate), poly(ethyl acrylate) and poly(propyl acrylate); polymethacrylates and polymers of methacrylic acid derivatives, such as poly(methyl methacrylate), poly(ethyl methacrylate), polypropyl methacrylate), and poly(methyl methacrylate) (PMMA); and polymers containing a heteroatomic molecule such as polyoxymethylene.

These thermally decomposable polymers preferably have a weight average molecular weight of 100 to 2,000,000, and more preferably has a molecular weight (Mw) of 1,000 to 100,000, in view of handleability.

The carbon precursor polymer is a polymer capable of being carbonized by heating, and can be exemplified by a polymer that contains a carbon atom selected from polyacrylonitrile (PAN), poly(methyl acrylate) (PMA), polyvinyl chloride, polyvinyl alcohol, polyimide, polyamide, phenolic resins, furan resins, polyoxadiazole, polyparaphenylene vinylene, polyvinylidene chloride, liquid-crystalline polymers, and the like. Among these, resins such as polyacrylonitrile, polyvinyl chloride, and polyvinyl alcohol are preferable in terms of being capable of facilitating crystal growth.

It is also possible to obtain a silicon carbide nanomaterial by using a polymer containing carbon and silicon, such as polycarbosilane, as the carbon precursor polymer.

In view of spinnability and infusibility, the carbon precursor polymer to be used preferably has a weight average molecular weight of 200 to 2,000,000, and more preferably has a molecular weight (Mw) of about 1,000 to about 100,000.

In the invention, the carbon precursor polymer may be a copolymer of a monomer that constitutes these preferred carbon precursor polymer and a monomer that constitutes the above-mentioned thermally decomposable polymer (for example, a copolymer of PMA and PSt, a copolymer of PAN and PMA, a copolymer of PAN and PMMA, and the like).

It is also possible to use a copolymer of a monomer that constitutes the carbon precursor polymer and a monomer that facilitates infusibilization (a monomer having a function of a radical initiator). When such a copolymer is used, the molar ratio of the monomer that constitutes the carbon precursor polymer and the monomer that facilitates infusibilization is preferably from about 99:1 to about 90:10, more preferably from about 96:4 to about 95:5.

In using a copolymer, when the proportion of the monomer that constitutes the carbon precursor polymer is too small, reduction in production efficiency of the carbon nanomaterial may be lowered.

Methods of producing the core-shell particles that contain the thermally decomposable polymer and the carbon precursor polymer will now be described.

Core particles can be formed by a method that is generally used for forming a particulate polymer, for example, a method in which a polymer solution is used as a starting material and a spray drier is used to form particles, or a method in which particles are chemically formed by polymerizing a monomer by solution polymerization, emulsion polymerization or the like. The core particles are formed from the thermally decomposable polymer.

The core particles produced according to the above method are then coated with a carbon precursor polymer, and are optionally further coated with a thermally decomposable polymer, thus forming the core-shell particles with an average particle size of about 10 to about 1000 nm.

Coating with the carbon precursor polymer may be performed by a conventional method such as a method in which core particles are immersed in a solution or dispersion of a carbon precursor polymer to form a coating, a physical coating method in which care particles and a carbon precursor polymer are mechanically mixed and the carbon precursor polymer is electrostatically deposited onto the surface of the core particles) and a chemical method in which a carbon precursor polymer is formed on the surface of core particles by polymerization. Preferred is the chemical method in terms of uniformity of the carbon precursor polymer coating.

The average thickness of the coating of the carbon precursor polymer that coats the core particles and the coating of the thermally decomposable polymer that further coats the carbon precursor polymer are about 10 to about 1000 nm, respectively, and the average particle diameter of the core-shell particles is about 50 to 5000 nm.

The inner diameter and outer shape of the resulting carbon nanotubes can be controlled by adjusting the diameter of the core particles and the average thicknesses of the carbon precursor polymer and the thermally decomposable polymer. Thus, the diameter of the core particles and the average thicknesses of the carbon precursor polymer and the thermally decomposable polymer are selected as appropriate according to the inner diameter and outer shape of the desired carbon nanotube.

Figure 2A:
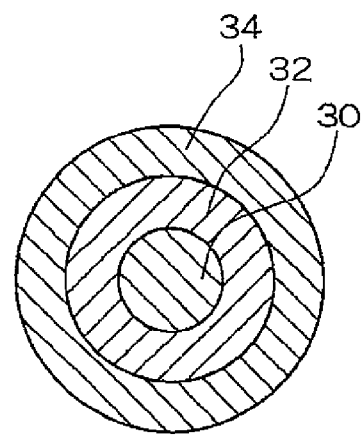
FIGS. 2A to 2C are schematic diagrams showing core-shell particles of the invention.
Figure 2B:
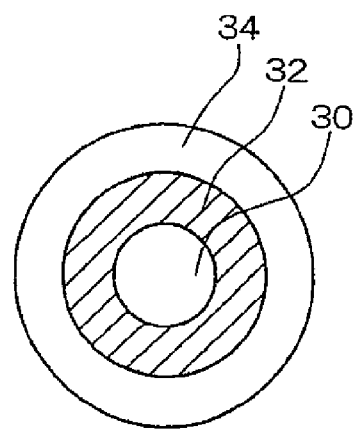
Figure 2C:
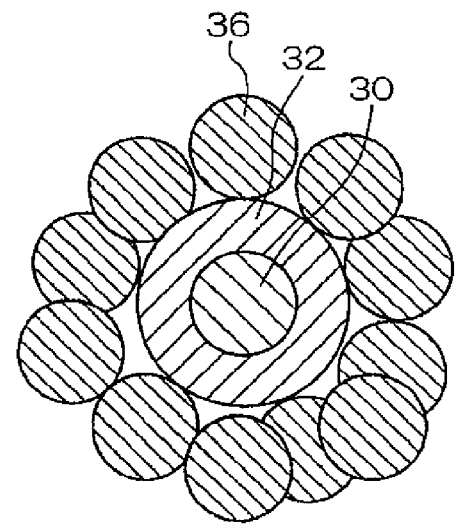

Examples of the core-shell particles are illustrated in FIGS. 2A to 2C. FIG. 2A illustrates a core-shell particle including a core particle 30 of PMMA, a coating 32 of a copolymer of PAN and PSt formed on the core particle 30, and further a coating 34 of PMMA formed thereon. FIG. 2B illustrates a core-shell particle including a core particle 30 of PSt, a coating 32 of a copolymer of PAN and PMA formed on the core particle 30, and further a coating 34 of PSt formed thereon. FIG. 2C illustrates a core-shell particle including a core particle 30 of PMMA and a coating 32 of a copolymer of PAN and PSt formed on the core particle 30, which is further dispersed in a large number of fine particles 36 of PMMA. The core particle 30 of PMMA coated with the coating 32 of a copolymer of PAN and PSt may further be coated with PMMA.

The core-shell particles thus formed as described above are then fed into the inside of the electric heater 12 from the material inlet. While the circular plate 10 is rotated at a rotational speed of, for example, about 500 to about 10,000 rpm, preferably about 2,500 to about 5,000 rpm, the electric heater is heated to a temperature at which phase separation of the core-shell particles is not caused to melt the core-shell particles, then a fiber is formed by applying centrifugal force to the core-shell particles to stretch. The temperature at which phase separation of the core-shell particles is not caused is from 100 to 270° C., and is set at 200° C. in the embodiment. In this process, ultra fine fibers with a diameter of about 1 to about 20 μm are formed from the core-shell particles by centrifugal melt spinning. In the fibers, there are a number of stretched core-shell particles that are oriented along the fiber axis.

The resulting fibers are then made infusible. The process of making the fibers infusible may be performed by a general method, specifically, a method of oxidizing the fibers at about 160 to about 250° C. in the air. After the treatment to make the fibers infusible, the fibers are heated and baked at high temperature so that the carbon precursor polymer is carbonized. In this process, the thermally decomposable polymer disappears from the core-shell particles that are oriented along the fiber axis, while the carbon precursor polymer is carbonized. The space where the thermally decomposable polymer has been and formed the core particle becomes void due to disappearance of the polymer, then a carbon nanotube having a diameter of, for example, about 20 to 50 nm is obtained.

The carbonization may be performed by a general method and, for example, performed at a temperature of about 500 to about 1500° C. under an inert atmosphere of nitrogen gas, argon gas or the like. In the heating process, the temperature rising rate is preferably from about 5 to about 10° C./minute, and the time period required for heating (time period of retention) may be determined by the time period in which the thermally decomposable polymer disappears, which is preferably from about 30 minutes to about 1 hour.

When carbon nanofibers are produced using the centrifugal melt spinning apparatus, core-shell particles comprising core particles of carbon precursor polymer fine particles coated with a thermally decomposable polymer may be used. The core-shell particles coated in such a manner can be produced in the same manner as described above. The obtained coated particles are formed into ultra fine fibers using the centrifugal melt spinning apparatus, according to the similar method to the above described production method of carbon nanotubes, and the resulting fibers are made infusible and then carbonized. In this case, carbon nanofibers are produced instead of carbon nanotubes having a hollow structure, since no thermally decomposable polymer is contained in the core particles.

EXAMPLES

Specific examples of the invention will now be described, however they are not intended to limit the scope of the invention.

Example 1

First, core-shell particles are prepared. The core-shell particles are the particles having a cross-sectional structure as shown in FIG. 2A, in which the core particle is made of poly(methyl methacrylate) (PMMA) and coated with a copolymer of polyacrylonitrile and polymethacrylic acid (95:5 in molar ratio), which is further coated with PMMA. The diameter of the core-shell particle is 350 μm.

[Preparation of Core-Shell Particles by Two-Stage Soap-Free Polymerization]

35 ml of methyl methacrylate (MMA), 35 mg of potassium persulfate (KPS) and 350 ml of deionized water are mixed and bubbling of a Nitrogen gas is performed for 0.5 hours while stirring. The temperature is then raised up to 70° C., and polymerization is performed while stirring for 4.5 hours. The reaction is further performed at a temperature of 80° C. for 0.5 hours.

90 ml of thus obtained emulsion that contains PMMA particles, 4 ml of acrylonitrile (AN), 5 mg of KPS, and 270 ml of deionized water are mixed and bubbling of nitrogen gas is performed for 0.5 hours while stirring. The temperature is then raised up to 70° C., and polymerization is performed while stirring for 4.5 hours. The reaction is further performed at a temperature of 80° C. for 0.5 hours. The core-shell particles having a two-layer structure in which a core particle of PMMA is coated with PAN are thus obtained.

In a similar manner to the above, MMA, KPS and deionized water are further added to the core-shell particle emulsion and polymerization is performed. The core-shell particles having a three-layer structure in which the core-shell particles further coated with PMMA are thus obtained.

The resulting core-shell particles are fed into the inside of the electric heater 12 from the material inlet of the centrifugal melt spinning apparatus shown in FIG. 1. The core-shell particles are melted while the temperature condition is kept at 260° C. by the electric heater, and centrifugal force is applied while the circular plate 10 is rotated at a rotational speed of about 5000 rpm to stretch the molten core-shell particles to form into fibers. In this process, ultra fine fibers with diameters of about 5 to about 20 μm and lengths of about 1 to about 5 cm are formed from the core-shell particles by centrifugal melt spinning.

Figure 3:
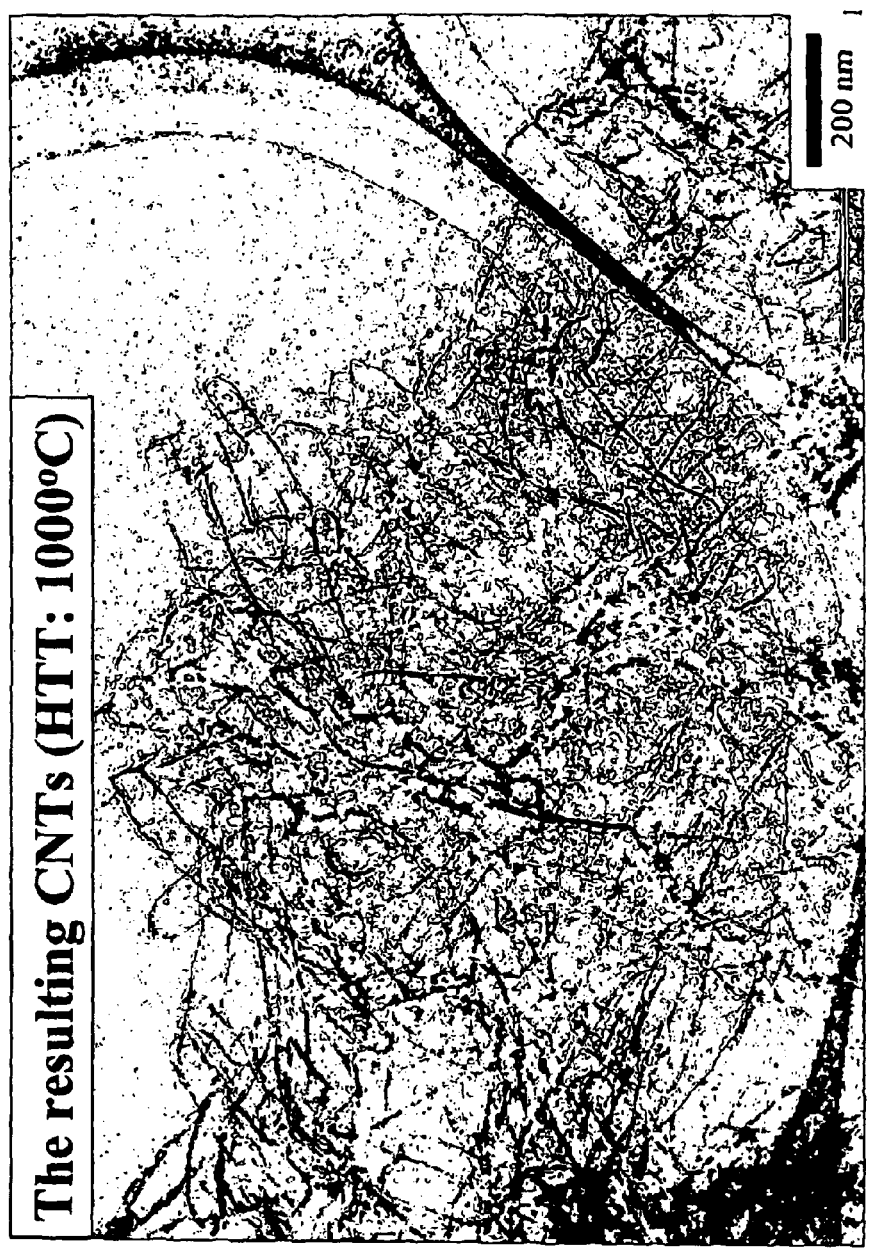
FIG. 3 is an electron micrograph of carbon nanotubes obtained in Example 1 of the invention.

The resulting fibers are then heated in ozone at 220° C. for 10 hours to be made infusible. The infusible fibers are heated in a nitrogen gas stream at 1000° C. for 1 hour so that the carbon precursor polymer is carbonized. As a result, the thermally decomposable polymer disappears and the carbon precursor polymer is carbonized, thus obtaining carbon nanotubes having voids inside that are formed by disappearance of PMMA, a component that has been forming the core particles. FIG. 3 is an electron micrograph of the resulting carbon nanotubes (taken with JEOL JEM 2010 at magnification of 12,000). With this micrograph, it was confirmed that a number of carbon nanotubes with diameters of 20 to 50 nm and lengths of about 200 to about 500 nm were obtained.

The invention claimed is:

1. A method of producing a carbon nanotube or carbon nanofiber comprising:

performing centrifugal melt spinning of core-shell particles to obtain a fiber by pressing the core-shell particles against a plate heater using centrifugal force, wherein the core-shell particles are formed from a carbon precursor polymer and a thermally decomposable polymer that disappears as a result of heat treatment, the plate heater has a number of pores that penetrate therethrough in a thickness direction of the plate heater, and the heater is heated to a temperature at which phase separation of the core-shell particles is not caused;

making the fiber infusible; and carbonizing the fiber after making it infusible to produce the carbon nanotube or carbon nanofiber.

2. The method of claim 1, wherein the core-shell particles are particles including fine particles comprising the thermally decomposable polymer that are coated with the carbon precursor polymer, or particles having a coating of the carbon precursor polymer that are further coated with the thermally decomposable polymer, and wherein a carbon nanotube is produced.

3. The method of claim 1, wherein the core-shell particles are particles in which fine particles comprising the carbon precursor polymer are dispersed among a large number of fine particles comprising the thermally decomposable polymer, and wherein a carbon nanotube is produced.

4. The method of claim 1, wherein the core-shell particles are particles including fine particles comprising the carbon precursor polymer that are coated with the thermally decomposable polymer, and wherein a carbon nanofiber is produced.

5. The method of claim 1, wherein the carbon precursor polymer comprises at least one monomer component selected from the group consisting of acrylonitrile, methyl acrylate, vinyl chloride, and vinyl alcohol.

6. The method of claim 1, wherein the thermally decomposable polymer is selected from the group consisting of an olefin polymer, a diene polymer, polyacrylate, a polymer of an acrylic acid derivative, polymethacrylate, and a polymer of a methacrylic acid derivative.

7. The method of claim 1, wherein the temperature at which phase separation of the core-shell particles is not caused is from 100° C. to less than 270° C.

8. The method of claim 1, wherein a silicon carbide precursor polymer containing carbon and silicon is used as the carbon precursor polymer, and a silicon carbide nanotube or nanofiber is produced.

* * * * *